Patented Dec. 9, 1952

2,621,190

UNITED STATES PATENT OFFICE 2,621,190

PROCESS FOR PRODUCING CONJUGATED STEROIDS

Byron Riegel, Evanston, Ill., assignor to The Glidden Company, Cleveland, Ohio, a corporation of Ohio No Drawing. Application January 2, 1948, Serial No. 355

5 Claims. (Cl. 260—397.2)

The present invention relates to the production of a new series of compounds in the steroid series, and more particularly it relates to steroids containing a cyclopropane ring conjugated with a carbon to carbon double bond.

Steroid compounds containing a cyclopropane ring conjugated with a carbonyl group have been prepared. The i-cholestenone of Windaus and Dalmer Ber., 52, 168 (1919) is such a compound. However, so far as is known, the preparation of steroid compounds containing a cyclopropane group conjugated with a carbon-carbon double bond was not known prior to the present invention.

It has been found that if the i-ethers of sterols are heated with alumina that the alcohol is split off with the formation of a $\Delta^{6-7}$-i-diene steroid hydrocarbon. On the basis of the physical and chemical evidence, the compound produced from cholesterol has been assigned the following formula:

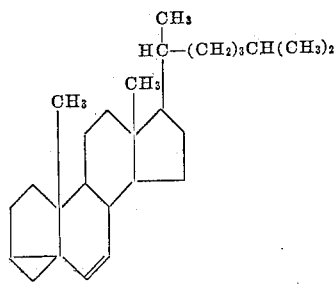

This compound was found to display unusual additional reactions with the usual compounds employed for such reactions, such as water, alcohols, acids, hydrogen, bromine, etc. In those cases where the compounds added have the formula HX, the X radical attaches to the 3-position with destruction of the cyclopropane ring and a shift of the double bond to the 5-6 position. In the case of bromine, two bromine atoms are added with the retention of one double bond, to form a 3,7-dibromo-$\Delta^{5,6}$ compound. Upon debromination with sodium iodide, cholesterilene is formed.

Hydrogenation at room temperature using palladium on charcoal gave cholestane.

The physical evidence of the cyclopropane ring conjugated to the ethylenic bond was the ultraviolet absorption spectrum of the hydrocarbon. The $\Delta^{6,7}$ i-cholestadiene showed a maximum absorption near 2100° A. which is between the absorption peaks of a conjugated diene and an ethylenic double bond. Chemical proof of structure was obtained by conversion to a known 6,7 dibasic acid.

The following examples are illustrative of the invention:

Example I $\Delta^6$-i-Cholestadiene.—A quantity of i-cholesteryl methyl ether was prepared from cholesteryl p-toluenesulfonate by the method of Stoll, Z. Physiol. Chem., 207, 147 (1932). The product was extensively purified by dissolving in petroleum ether, B. P. 30–60° C. and passing the solution through a column of activated alumina, chromatographic, 80–200 mesh. The i-ether was eluted with the same solvent in the first fractions of percolate and after recrystallization from acetone, melted at 79.5–80° C.

Seventy grams of alumina and 700 ml. of xylene were refluxed, using a moisture determination tube between the condenser and reaction flask to remove the water present. When water ceased to collect in the tube, 20 g. of i-cholesteryl methyl ether was added. After refluxing for twenty hours, an additional 5 g. of alumina was added and refluxing continued for ten more hours. The alumina was removed by filtration and washed with three portions of hot xylene. The filtrate and washings were combined and the xylene removed under reduced pressure. There remained a pale yellow oil which crystallized on standing. The residue was dissolved in 50 ml. of petroleum ether and passed through a 75 g. column of alumina. The first four 25-ml. fractions, eluted with the same solvent, gave 14.1 g. (77%) of colorless crystals, which after recrystallization from 110 ml. of acetone gave 13.2 g. of thick needles, M. P. 73° C., $(a)_D{}^{25}$—47.2±0.7° (28.2 mg. made up to 2 ml. with chloroform, $a_D$ —1.33°, $l$, 2 dm.).

Anal.—Calcd. for C$_{27}$H$_{44}$: C, 87.96; H, 12.03. Found: C, 87.78, 87.96; H, 12.07, 11.80.

Later, fractions eluted with benzene-ethanol mixtures gave 0.2 g. of cholesteryl methyl ether, M. P. 82–83°. This was probably formed by addition of methanol to the i-diene.

Example II

Cholesteryl acetate.—A mixture of 1 g. of the i-diene of Example I and 25 ml. of glacial acetic acid containing several drops of concentrated sulfuric acid was refluxed for one hour. The acetic acid was removed under reduced pressure and the residue crystallized from methanol. There was obtained 1.05 g. of pale yellow crystals, M. P. 104–106° C., which, after recrystallization from an acetone-methanol mixture, gave 0.85 g.

of colorless crystals, M. P. 112–113° C. A mixed melting point with an authentic sample of cholesteryl acetate gave no depression.

Example III

*Cholesteryl chloride.*—A solution of 0.5 g. of i-diene of Example I in 15 ml. of acetone and 0.5 ml. of concentrated hydrochloric acid was refluxed for four hours. After standing in the cold, 0.43 g. of colorless crystals was obtained, M. P. 93.4–93.5°. From the mother liquor there was obtained an additional 0.07 g., M. P. 89–90° C. No depression was observed in a mixed melting point with cholesteryl chloride.

Example IV

*Cholesteryl bromide.*—A solution of 0.4 g. of i-diene of Example I in 15 ml. of acetone and 0.4 ml. of hydrobromic acid (42%) was refluxed for three hours. After cooling, there was obtained 0.52 g. of white crystals, M. P. 90° C. There was no depression in a mixed melting point with an authentic sample of cholesteryl bromide.

Example V

*Cholesteryl iodide.*—To a solution of 0.5 g. of the i-diene of Example I in 35 ml. of dry acetone was added 1 ml. of hydroiodic acid, 55–58%. After one minute a crystalline precipitate separated. The solution was warmed until the precipitate dissolved and the solution cooled for several hours. The crystalline product, 0.58 g. of fine colorless needles, was removed by filtration. The product melted at 106–106.5 C. $(a)_D^{25}$—12.6°.

Example VI

*Cholesterol.*—A solution of 0.5 g. of the i-diene of Example I in 20 ml. of acetone and 2.5 ml. of 65% sulfuric acid was refluxed for three hours. After cooling, there was obtained 0.37 g. of cholesterol, M. P. 144.5–145° C. A mixed melting point with cholesterol gave no depression.

Example VII

*Cholesteryl methyl ether.*—A solution of 0.5 g. of the i-diene of Example I in 70 ml. of anhydrous methanol containing 5 drops of concentrated sulfuric acid was refluxed twenty-four hours. After standing at room temperature, pearly crystals, M. P. 82–83° C., separated from the solution. A second crop, M. P. 82–82.5° C. was obtained by concentrating the mother liquor and cooling, giving a total yield of 0.4 g. A mixed melting point with a sample of cholesteryl methyl ether gave no depression.

Example VIII

*Bromination of the i-diene.*—A solution of 5.0 g. of i-diene of Example I in 20 ml. of chloroform was brominated in the cold by the slow addition of 2.17 g. of bromine in 25 ml. of chloroform. The solvent was removed under reduced pressure without heat, leaving a yellow, partly crystalline residue. Acetone was added to the residue and the insoluble crystalline material was removed by filtration and washed with acetone until colorless. The product, 3.45 g., melted at 138–140° C. After concentrating the mother liquor, and recrystallization of the product, there was obtained a total of 5.41 g. of material, M. P. 140–141° C. Further crystallizations raised its M. P. to 143–144° C.

*Anal.*—Calcd. for $C_{27}H_{44}Br_2$: C, 61.36; H, 8.39; Br, 30.25. Found: C, 61.69; H, 8.57; Br, 30.65 $(a)_D^{23}$—206° (21.1 mg. made up to 5 ml. with $CCl_3$, $l$, 2 dm.). This dibromide was identical with the dibromide prepared from cholesteryl bromide by treatment with N-bromsuccinamide, and is therefore 3,7-dibromo-$\Delta^5$-cholestene.

Example IX

*Debromination of the dibromide.*—A solution of 2.67 g. of the dibromide of Example VIII and 6 g. of sodium iodide in 300 ml. of dry acetone was refluxed for three hours. Free iodine was removed by means of a 10% sodium thiosulfate solution. The solution was concentrated to 20 ml., water added and the solution extracted with ether. The ether solution was washed and dried and the ether removed under reduced pressure. There remained 1.96 g. of a pale yellow crystalline residue. This residue was dissolved in 25 ml. of petroleum ether and chromatographed on 28 g. of alumina. The column was eluted with the same solvent collecting first a 20 ml. fraction and a second 40 ml. fraction. From the first fraction was obtained 1.05 g. of residue, which after four crystallizations from acetone melted at 80–80.5° C., $(a)_D^{25}$—81.5° (0.1212 g. made up to 5 ml. with chloroform, $l$, 1 dm.). A mixed melting point with cholesterilene, M. P. 78.5–79.5° C., $(a)_D^{25}$—91.5° (0.1267 g. made up to 5 ml. with chloroform, $l$, 1 dm.) prepared from monocholesteryl phosphoric acid by the method of Muller and Page (J. Biol. Chem., 101, 127 (1933)), gave no depression.

Example X

*Attempted rearrangement of i-diene.*—A solution of 2.0 g. of the i-diene of Example I, 4 g. of sodium iodide, and 1 g. of iodine in 100 ml. of dry acetone was refluxed for twenty-four hours. Twenty ml. of 10% thiosulfate solution was added to remove the free iodine and the solution concentrated under reduced pressure to 10 ml. The solution was diluted with water and extracted with ether. The ether solution was washed with water and dried over anhydrous sodium sulfate. The dark, oily residue obtained by the removal of ether was dissolved in 30 ml. of petroleum ether and filtered through 28 g. of alumina. The column was then eluted with 100 ml. of the same solvent. Removal of the petroleum ether left a solid, 1.78 g., which after recrystallization from acetone proved to be the starting material.

Example XI

*Hydrogenation of the i-diene.*—Twenty ml. of dioxane was shaken with 0.3 g. of palladium on charcoal at room temperature until saturated with hydrogen. Then 0.4 g. of the i-diene of Example I was added and hydrogenation continued. After fifty minutes, 25.2 ml. of hydrogen was absorbed. The theory for two double bonds was 25.0 ml. The catalyst was removed by filtration and the solvent removed under reduced pressure, leaving a colorless oil. After repeated crystallizations from methanol, a small amount of crystalline material was obtained, M. P. 78–79° C. A mixed melting point with cholestane showed no depression.

Example XII

*i-6||7-cholestene-diacid-6,7 from $\Delta^6$-i-cholestadiene.*—To a solution of 0.500 g. (.00135 M) of i-cholestadiene in 20 ml. of pyridine was added a solution of 0.57 g. (.0036 M) of potassium permanganate in 15 ml. of water and 20 ml. of pyridine. The pyridine solution was kept cold by means of an ice bath during this addition. The resulting solution was then allowed to stand at room temperature until all of the potassium permanganate had reacted; this took from 20 to 22 hours. After a small amount of sodium bisulfite had been added to insure reduction of the permanganate, the suspension was poured into 100 ml. of a 5% sodium hydroxide solution. This strongly basic solution was heated on the steam bath, then filtered with suction. The precipitate of manganese dioxide was suspended in 20 ml. of 3% sodium hydroxide; the suspension was heated on a steam bath, and again filtered. The combined filtrates were then extracted with three 50 ml. portions of ether to free them from any non-acidic material and also from excess pyridine. The product was precipitated from the aqueous solution on acidification with concentrated hydrochloric acid. The product was extracted with ether; then the ether solution evaporated to dryness. The acid was isolated in a crystalline form by the evaporation at room temperature of a dilute acetone solution of the residue. In this way 0.202 g. (35% yield) of the desired dibasic acid, M. P. 234–237° C. was obtained. Crystallization from dilute alcohol raised this melting point to 236–237° C., $(a)_D^{23.5} = 15.1°$ (42.2 mg. of compound made up to 5 ml. with absolute acetone, $a=0.248°$; $l$, 2 dm.). The specific rotation of this acid in chloroform at 26.5° was $-10.4 \pm 1°$ (41.7 mg. made up to 5 ml. with chloroform, $a=0.174°$; $l$, 2 dm.). A mixture of this acid with the i-6∥7-cholestene-diacid-6,7 prepared by the oxidation of i-cholestenone-6 with KOH-Br in pyridine according to Ladenberg, Chakravorty and Wallis, J. Am. Chem. Soc., 61, 3843 (1939) showed no depression of melting point.

*Example XIII*

$\Delta^6$-i-Stigmastatriene.—A mixture of a solution of 5.0 g. of i-stigmasteryl methyl ether in 150 cc. of xylene and 15.0 g. of activated alumina was refluxed for twenty hours. The mixture was filtered and the residue was washed with xylene. The xylene solution was then steam distilled and the residue was extracted with ether. The ether solution was washed with water, dried and concentrated to a yellow sirup, 4.5 g. This material was dissolved in 25 cc. of petroleum ether (B. P. 35–60° C.) and passed through an activated alumina column (8.5 cm.×2.0 cm.). Upon eluting with petroleum ether, there was obtained 3.3 g. of crystalline material which after recrystallization from acetone melted at 66.5–68.5° C.

Treatment of a sample of the $\Delta^6$-i-stigmastatriene with acetic acid, containing a few drops of concentrated sulfuric acid, at steam bath temperature for several hours yielded stigmasteryl acetate, M. P. 141–143.5° C.

The reactions of the compounds of the present invention with compounds of the formula HX may be generally illustrated by the following equation:

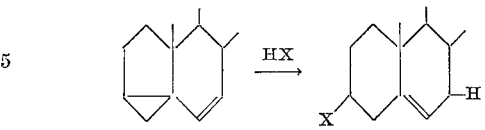

The foregoing examples are illustrative of the invention. Various modifications may be made therein. Thus other steroids may be used and other 6-alkoxy groups than the methoxy group may be present in such steroids. These may be formed in the manner indicated by making the corresponding substitutions. Thus ethoxy groups may be introduced by substituting ethanol for methanol in the preparation of the i-ethers. Also other 3-hydroxy steroids such as sitosterol may be used as starting materials.

Similarly, other alcohols than methanol may be used for the addition reaction when forming the 3-alkoxy $\Delta^{5,6}$ compounds. Likewise, other acids than acetic and the hydrohalogens may be used for forming the esters.

Having disclosed the invention, what is claimed is:

1. The process which comprises heating a solution of a 6-alkoxy-i-steroid of the 10,13-dimethyl series with alumina until the alkanol is split off and an i-steroid having the cyclopropane group conjugated with a carbon-carbon double bond is formed.

2. The process of claim 1 in which the alkoxy group is the methoxy group and the alkanol split off is methanol.

3. The process of claim 1 in which the i-steroid 6-alkoxy compound is an i-alkoxy ether of a sterol.

4. The process of claim 1 in which the alkoxy group is a methoxy group and the i-steroid 6-alkoxy compound is an i-alkoxy ether of a sterol.

5. The process which comprises heating a solution of a 6-alkoxy-i-steroid of the 10,13-dimethyl series and possessing a hydrocarbon side chain attached to the 17-carbon atom of the steroid nucleus with alumina until the alkanol is split off and an i-steroid having the cyclopropane group conjugated with a carbon-carbon double bond is formed.

BYRON RIEGEL.

REFERENCES CITED

The following references are of record in the file of this patent:

Riegel et al.: "J. Am. Chem. Soc.," vol. 68, pp. 2562–2564 (1946).

Klotz: J. Am. Chem. Soc., 66, 88–91 (1944).